United States Patent [19]
Coil

[11] 3,712,588
[45] Jan. 23, 1973

[54] CHAIN ACCESSORY DEVICE
[76] Inventor: Frederick J. Coil, 109 Latham Trailer Courts, Latham, N.Y. 12110
[22] Filed: July 12, 1971
[21] Appl. No.: 161,746

[52] U.S. Cl. ................................................. 254/78
[51] Int. Cl. ............................................. B66f 3/00
[58] Field of Search ..................... 24/216; 254/74, 78

[56] References Cited

UNITED STATES PATENTS

| | | | |
|---|---|---|---|
| 2,049,710 | 8/1936 | Livingston | 254/74 |
| 3,261,588 | 7/1966 | Jensen et al. | 254/74 |

FOREIGN PATENTS OR APPLICATIONS 499,466  1/1954  Canada .................................. 254/78

Primary Examiner—Othell M. Simpson
Attorney—Walter F. Wessendorf, Jr.

[57] ABSTRACT

Discloses a chain accessory device for mounting a chain to be repaired, and for tightening same and at the same time rendering slack a portion of the chain for purposes of repair. A barrel slide member is slidable within a main-body member, with both members having depending, cylindrically configured, upper and lower chain guides accommodating, respectively, a small chain or large chain. Aligned holes in the slide member, main-body member and chain guides receive chain pins to engage and retain the chain accommodated. Relative rectilinear movement of the barrel slide member and main-body member is effected by rotary movement of an operatively engaged, bifurcated lever to tighten the accommodated chain and at the same time to render the portion of the accommodated chain between the chain pins slack for purposes of repair. As a safety feature, the lever is rotatable beyond its position of greatest force application to positive-lock position. An added safety feature is provided by a pawl retentively engageable with ratchet teeth.

10 Claims, 4 Drawing Figures

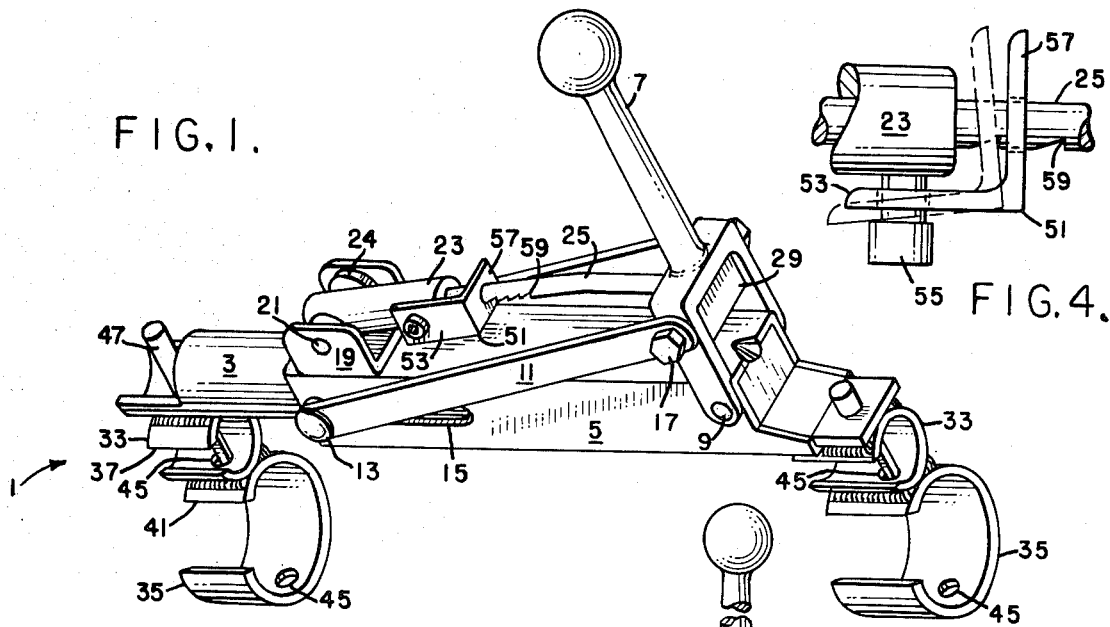
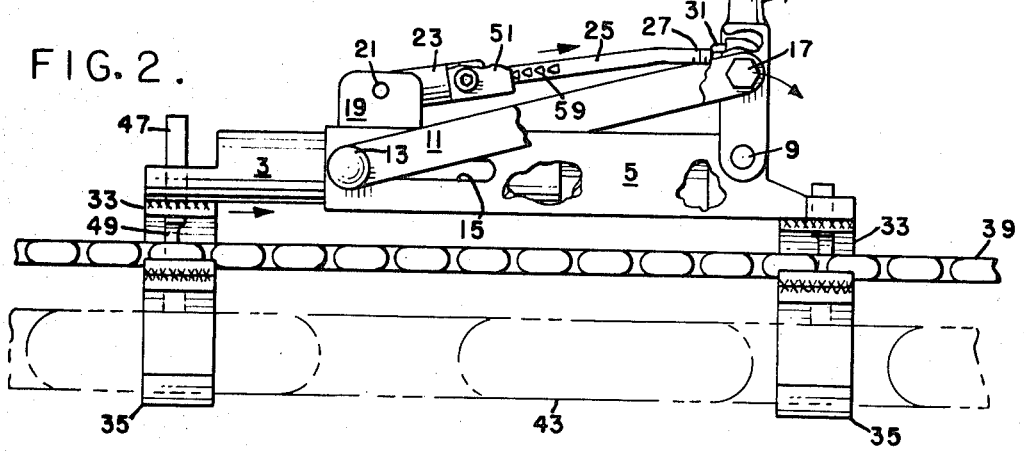
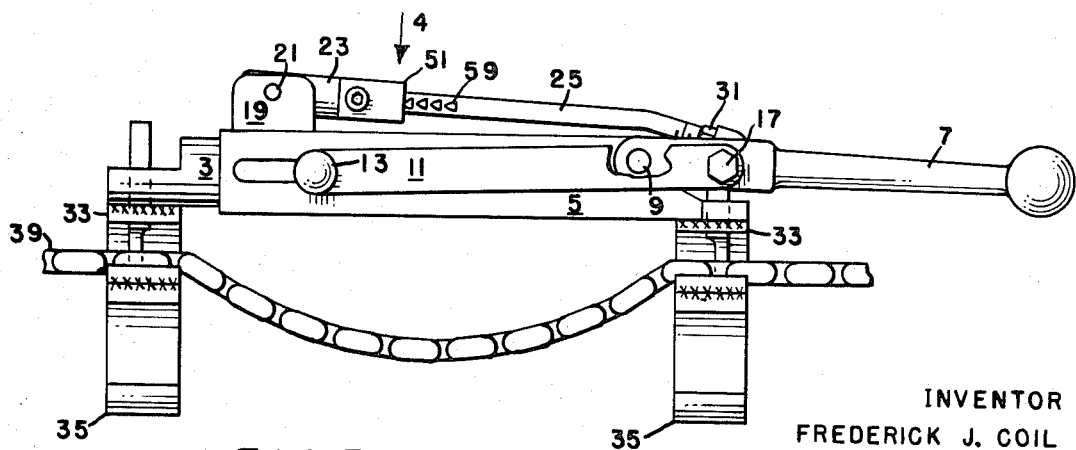

CHAIN ACCESSORY DEVICE

This invention relates to a chain accessory device for use in mounting a chain to be repaired, and for tightening same and at the same time rendering slack a portion of the chain for purposes of repair.

Industrial use of drive chains results in the chains being broken, stretched or otherwise necessitating repair. Industrial drive chains range up to several hundred feet in length. In the course of its use, a chain either breaks, is stretched beyond operative or continued safe use, or is otherwise rendered in need of repair necessitating repair of the chain by replacement of a broken or defective link, shortening of a chain stretched by removal of a link or half link, or other repair of the chain. Such repair often requires several hours of costly machine shut-down time while a chain operatively associated and used with a machine is removed from the machine, repaired and replaced in the machine, and at the same time also requires the active and stand-by assistance of several repairmen, besides their man-hours, in order to accomplish the removal, repair and replacement of the chain in need of repair. It should be appreciated that with a drive chain several hundred feet in length, the chain-repair problems are made correspondingly more difficult and time consuming for reason of the multitude of drive, driven and idler sprockets around which the drive chain is trained and with which it is operatively engaged, and the natural inherent slackness of the chain as well as its gravity slackness resulting from the distances between these sprockets.

Accordingly, the object of the invention is to provide a chain accessory device for use in repairing chains which contributes to solving the discussed problems of the art. The chain to be repaired does not have to be removed from its machine for repair because the chain accessory device can be easily and quickly mounted on the chain needing repair while at the same time such chain needing repair remains engaged with its drive, driven and idler sprockets thereby allowing the chain to be repaired by one repairman, minimizing machine shut-down time for repair and minimizing the man-hours required theretofore for repair.

This object and other objects of the invention should be discerned and appreciated from the detailed specification taken in conjunction with the drawings, wherein like reference numerals refer to similar parts throughout the several views, in which:

FIG. 1 is a perspective view of the invention;

FIG. 2 is a view of the invention preparatory to its operative use;

FIG. 3 is a view of the invention in its operative use; and

FIG. 4 is a view taken in the direction of the arrow 4 in FIG. 3.

To facilitate the understanding of the invention, a nomenclature list is hereby provided:

NOMENCLATURE
1 generally refers to invention
3 barrel slide member
5 main-body member
7 bifurcated lever
9 cross pin
11 arms
13 cross pin
15 elongated slots
17 nut-engaged bolt
19 upstanding U-shaped member
21 cross pin
23 cylindrical slide
24 spacer washers
25 arcuate-shaped rod
27 threaded end of rod 25
29 cross block
31 nut engaged with threaded end 27
33 upper chain guides
35 lower chain guides
37 open wall portions of upper chain guides 33
39 small chain
41 open wall portions of lower chain guides 35
43 large chain
45 holes
47 chain pins
49 tapered terminal end portions of chain pins 47
51 L-shaped pawl
53 leg of pawl 51
55 screw
57 other leg of pawl 51
59 ratchet teeth in rod 25

In FIG. 1 of the drawings, reference numeral 1 generally refers to the invention. A barrel slide member 3 is slidably received within square-shaped main-body member 5, as shown. Bifurcated lever 7 is pivotally mounted at its terminal end portion by means of a transversely disposed cross pin 9. Two arms 11 are operatively engaged with lever 7, and slide member 3 and main-body member 5, by means of a cross pin 13 disposed through holes formed in the terminal end portions of arms 11, received and guided by elongated slots 15 formed through the lateral sides of main-body member 5, and received through and engaged with complemental, transverse holes, not shown, formed in the common sides of slide member 3; and by means of a nut-engaged bolt 17 freely disposed through holes formed through the other terminal end portions of arms 11 and freely received through complemental holes formed through the substantially mid-portion of bifurcated lever 7.

U-shaped member 19 upstanding from main-body member 5 has a cross pin 21 transversely disposed therethrough which pivotally mounts one end of a cylindrical slide 23, spaced apart in its mounting by spacer washers 24, with cylindrical slide 23 freely mounting and receiving therein one end of an arcuate-shaped rod 25. The other threaded end 27 of rod 25 is engaged with a tapped hole formed in a cross block 29 freely receiving therethrough bolt 17. Adjustable disposition of the threaded end 27 of rod 25 relative to cross block 29 is maintained by nut 31 engaged on the threaded end 27 of rod 25 and tightened against cross block 29.

Fixed to and depending from slide member 3 and main-body member 5 are upper and lower chain guides 33 and 35, respectively, as shown. Upper chain guides 33 are substantially cylindrical in configuration and have open wall portions 37 to facilitate reception of and disposition therein of a small chain 39. Lower chain guides 35 are substantially cylindrical in configuration and have open wall portions 41 to facilitate reception of and disposition therein of a large chain 43.

Aligned and corresponding holes 45 formed through slide member 3, its associated upper and lower chain guides 33 and 35, and through main-body member 5, its associated upper and lower chain guides 33 and 35, receive chain pins 47 having tapered terminal end portions 49 to facilitate insertion between the cross elements of the chain to be repaired.

Although the description herein is given for use of the device with an open, cross-link type of chain, it should be appreciated that the device can be utilized with other types of chains such as the oval-type chains.

It should be noted that the chain pins 47 shown are for use in retaining small chain 39 for purposes of repair. When the device is to be utilized for repairing a large chain 43, one simply employs chain pins that are longer than chain pins 47 shown.

As shown, the device is being utilized for effecting repair of small chain 39 by appropriate disposition of small chain 39 in the upper chain guides 33 for its accommodation with retention therein by appropriate disposition of chain pins 47 through holes 45 for their abutting engagement with the cross elements of small chain 39, and with disposition and facing of the tapered terminal end portions 49, as shown, thereby minimizing chain slack.

Next lever 7 is rotated clockwise to its right and to its positive-lock position as shown in FIG. 3. As lever 7 is rotated clockwise to its right, cross pin 13 moves to its right rectilinearly guided by elongated slots 15, and cross pin 13, by its rightward movement, constrains slide member 3 to move to its right within main-body member 5 and chain pin 47, carried by slide member 3 and engaged between cross elements of small chain 39, tightens small chain 39 on whatever drive, driven and idler sprockets are operatively engaged by small chain 39, and at the same time correspondingly renders slack that portion of small chain 39 between chain pins 47. The greatest amount of force is applied by lever 7 when the center of bolt 17 is on the imaginary centerline passing through the centers of cross pins 9 and 13. Hence, when lever 7 is fully rotated to its right, the center of bolt 17 will lie below the imaginary centerline passing through the centers of cross pins 9 and 13 with lever 7 exerting less force and thereby constituting its positive-lock position.

In addition to the safety feature of the positive-lock position of lever 7, another safety lock feature is provided by the pawl and ratchet mechanism to assure that lever 7 will not be released from its operative position shown in FIG. 3. An L-shaped pawl 51 has one leg 53 loosely mounted on the lateral side of cylindrical slide 23 by means of a screw 55 disposed through a hole formed through leg 53 and engaged with a tapped hole formed in cylindrical slide 23. A hole formed through the other leg 57 of L-shaped pawl 51 and receiving arcuate-shaped rod 25 is operatively disposed for retentive engagement with ratchet teeth 59 formed in the common lateral side of arcuate-shaped rod 25. Pawl 51 is engaged with one of the ratchet teeth 59 by appropriate movement toward ratchet teeth 59 and released from engagement by appropriate movement away from ratchet teeth 59.

Obvious should be the simplicity and ease of effecting repair to the slack portion of small chain 39 such as by shortening the chain or replacing a broken link, and without the necessity of removing the chain from the machine with which it is used. It should be further obvious and appreciated that utilizing the device of this invention allows chain repairs to be made quickly by only one repairman with the chain remaining in its machine and with minimal machine shut-down time.

After repair of the chain 39 has been completed, pawl 51 is released, lever 7 is rotated counterclockwise to its left, chain pins 47 are removed from their engagements with the cross elements of chain 39 and the device is removed from chain 39.

When the device is employed to effect repair of a large chain such as chain 43, the same procedure described for repair of small chain 39 is followed but with large chain 43 being disposed in the lower chain guides 35 and with longer chain pins 47 being utilized.

Accordingly, from the foregoing description of the invention it should be appreciated that this invention has contributed to the art by providing a chain accessory device which can be utilized by one repairman to effect chain repair and with the chain to be repaired remaining on the machine thereby minimizing machine shut-down time and man-hours required heretofore for removal, repair and replacement of a chain.

Having thusly described my invention, I claim:

1. A chain accessory device for mounting a chain to be repaired, and for tightening same and at the same time rendering slack a portion of the chain for purposes of repair, said device comprising a main-body member, slide member, lever, arms, chain guides and chain pins; said main-body member slidably receiving therein said slide member, said main-body member pivotally mounting said lever, said slide member and lever pivotally and operatively mounting said arms such that upon operative movement of said lever said slide member is slidably moved within said main-body member, said main-body member and slide member carrying said chain guides, said chain guides mounting and accommodating a chain to be repaired, said main-body member, slide member and chain guides having aligned holes receiving said chain pins for engagement with said chain, said lever being operative in one direction of its movement to tighten said mounted and accommodated chain and at the same time render slack a portion of said chain between said engaged chain pins for purposes of repair.

2. A chain accessory device in accordance with claim 1, wherein said arms are pivotally mounted with said slide member by means of a cross pin, wherein said main-body member has elongated slots formed therethrough receiving and guiding said cross pin.

3. A chain accessory device in accordance with claim 1, wherein said chain guides carried by said main-body member and slide member are substantially cylindrical in configuration and have open wall portions to facilitate reception of and disposition therein of a chain.

4. A chain accessory device in accordance with claim 1, wherein said chain guides carried by said main-body member and slide member are upper and lower chain guides, wherein each of said upper and lower chain guides is cylindrical in configuration and has an open wall portion to facilitate reception of and disposition therein of a chain, wherein said upper chain guides accommodate a small chain and said lower chain guides accommodate a large chain.

5. A chain accessory device in accordance with claim 1, wherein said chain pins have tapered terminal end portions to facilitate their insertion between the cross elements of a chain.

6. A chain accessory device in accordance with claim 1, wherein the force applied to said lever in tightening the accommodated chain is greatest when the centers of the pivotal mountings of said main-body member and lever, and of said slide member, lever and arms, lie on the same imaginary centerline passing through their centers, and wherein said lever is movable to a positive-lock position such that the center of the pivotal mounting of said main-body member and lever is disposed below said imaginary centerline.

7. A chain accessory device in accordance with claim 1, wherein are further provided a U-shaped member, cylindrical slide, rod, cross block and pawl, wherein said main-body member carries said U-shaped member, wherein said U-shaped member pivotally mounts said cylindrical slide, wherein said cylindrical slide freely mounts and receives one end of said rod, wherein said cross block carries the other end of said rod, wherein said pivotal mounting of said arms and lever pivotally mounts said cross block, wherein said cylindrical slide loosely mounts said pawl and wherein said pawl is disposed for retentive engagement with ratchet teeth formed in said rod.

8. A chain accessory in accordance with claim 1, wherein said arms are pivotally mounted with said slide member by means of a cross pin, wherein said main-body member has elongated slots formed therethrough receiving and guiding said cross pin, wherein said chain guides carried by said main-body member and slide member are substantially cylindrical in configuration and have open wall portions to facilitate reception of and disposition therein of a chain to be repaired, wherein said chain pins have tapered terminal end portions to facilitate their insertion between the cross elements of a chain.

9. A chain accessory device in accordance with claim 1, wherein said arms are pivotally mounted with said slide member by means of a cross pin, wherein said main-body member has elongated slots formed therethrough receiving and guiding said cross pin, wherein said chain guides carried by said main-body member and slide member are upper and lower chain guides, wherein each of said upper and lower chain guides is substantially cylindrical in configuration and has an open wall portion to facilitate reception of and disposition therein of a chain, wherein said upper chain guides accommodate a small chain and said lower chain guides accommodate a large chain.

10. A chain accessory device in accordance with claim 1, wherein said arms are pivotally mounted with said slide member by means of a cross pin, wherein said main-body member has elongated slots formed therethrough receiving and guiding said cross pin, wherein said chain guides carried by said main-body member and slide member are substantially cylindrical in configuration and have open wall portions to facilitate reception of and disposition therein of a chain to be repaired, wherein said chain pins have tapered terminal end portions to facilitate their insertion between the cross elements of such chain, wherein the force applied to said lever in tightening such chain is greatest when the centers of the pivotal mountings of said main-body member and lever, and of said slide member, lever and arms, lie on the same imaginary centerline passing through their centers, wherein said lever is movable to a positive-lock position such that the center of the pivotal mounting of said main-body member and lever is disposed below said imaginary centerline; and wherein are further provided a U-shaped member, cylindrical slide, arcuate-shaped rod, cross block and pawl, wherein said main-body member carries upstanding therefrom said U-shaped member, wherein said U-shaped member pivotally mounts said cylindrical slide, wherein said cylindrical slide freely mounts and receives one end of said rod, wherein said cross block carries the other end of said rod, wherein said pivotal mounting of said arms and lever pivotally mounts said cross block, wherein said cylindrical slide loosely mounts said pawl and wherein said pawl is disposed for retentive engagement with ratchet teeth formed in said rod.

* * * * *